(12) United States Patent
Ueda et al.

(10) Patent No.: US 6,496,315 B1
(45) Date of Patent: Dec. 17, 2002

(54) DISK DRIVE WITH OFF-TRACK WRITE PREVENTION

(75) Inventors: Tetsuo Ueda, Sagamihara (JP); Yukio Fukushima, Tokyo-to (JP); Tatsuya Sakai, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,233

(22) Filed: Nov. 24, 1999

(30) Foreign Application Priority Data

Nov. 26, 1998 (JP) .......................... 10-335817

(51) Int. Cl.$^7$ ............................... G11B 15/04
(52) U.S. Cl. .................. 360/60; 360/77.08; 360/78.01; 360/78.09
(58) Field of Search ............... 360/60, 77.05, 360/75, 78.01, 77.02, 78.09, 77.08

(56) References Cited

U.S. PATENT DOCUMENTS 4,679,103 A * 7/1987 Workman .................... 360/77
5,831,787 A * 11/1998 Yoshida et al. ........... 360/78.09

FOREIGN PATENT DOCUMENTS

| JP | 6-89406 | 3/1994 | ............ G11B/5/09 |
| JP | 6-103592 | 4/1994 | ............ G11B/7/085 |
| JP | 6243517 A2 | 9/1994 | ............ G11B/21/10 |
| JP | 8-106742 | 4/1996 | ............ G11B/21/10 |
| JP | 10-134532 | 5/1998 | ............ G11B/21/10 |

* cited by examiner

Primary Examiner—David Hudspeth
Assistant Examiner—Varsha A. Kapadia
(74) Attorney, Agent, or Firm—G. Marlin Knight; Ron Feece

(57) ABSTRACT

A disk drive with the capability to prevent off-track writing with reduced false triggering is described. An improved method of predicting the position of a head is used to determine whether the head is on or off-track. A position error signal at an nth servo position $P_n$ and a velocity $V_n$ at the nth servo position ($V_n = P_n - P_{n-1}$) are calculated using values read at the nth and n−1 head positions. Based on these $P_n$ and $V_n$ and on the output of the servo controller at the nth servo position $U_n$, the predicted $PES_{n+1}$ is calculated as:

Predicted $PES_{n+1} = P_n + V_n + kU_n$ where k is a constant.

Data is inhibited from being written between the nth servo position and the (n+1) servo position, when absolute values of the calculated $P_n$, $V_n$, and predicted $PES_{n+1}$ meet any condition of the following conditions (1) through (3): (1) $|P_n|>C1$, (2) $|V_n|>C2$, and (3) $|\text{Predicted } PES_{n+1}|>C3$ where C1, C2, and C3 are constants determined for the embodiment.

4 Claims, 4 Drawing Sheets

DISK DRIVE WITH OFF-TRACK WRITE PREVENTION

FIELD OF THE INVENTION

The present invention relates to method and apparatus for preventing off-track writing in a disk drive. More particularly the invention relates to inhibiting a write operation when the predicted position of a read/write head is off-track.

RELATED BACKGROUND ART

A magnetic disk drive is designed with a means of inhibiting write operation at an off-track position, i.e., the read/write head is not over the correct track, in order to insure that data is recorded on the correct track on the disk. To prevent an off-track write, there is a conventional method of utilizing a position error signal (PES) calculated from a signal obtained by reading servo burst patterns on the disk. In Published Unexamined Patent Application No. 6-243617 there is disclosed an example of a method of utilizing the PES.

Recently another method of preventing off-track writing has been described in which the sum (P+V) of the PES(P) and velocity (V) is used as a predicted PES and a comparison is made with this predicted PES as a reference value in order to allow or inhibit write operations. In this method, PES ($P_n$) and velocity ($V_n = P_n - P_{n-1}$) are calculated from a value by reading the nth servo position. Based on the calculated $P_n$ and $V_n$, the following predicted $PES_{n+1}$ is calculated.

$$\text{Predicted } PES_{n+1} = P_n + V_n$$

The read/write head is inhibited from writing data onto a track between the nth servo position and the (n+1) servo position, when the absolute values of the calculated $P_n$, $V_n$, and $PES_{n+1}$ meet any condition of the following conditions (1) through (3):

$$|P_n| > C1 \quad (1)$$

$$|V_n| > C2 \quad (2)$$

$$|\text{Predicted } PES_{n+1}| > C3 \quad (3)$$

where C1, C2, and C3 are constants.

However, in the above-mentioned method of utilizing a predicted $PES_{n+1}$, if the predicted PESn+1 significantly differs from the actual $PES_{n+1}$, then the write operation may be unnecessarily inhibited, i.e., falsely triggered. For example, in the (n+1) servo position in FIG. 4(a), when the actual $PES_{n+1}$ is present outside a range of the inhibition criteria with respect to a target track T and is present at a position where write inhibition is unnecessary, the predicted $PES_{n+1}$ is within the range of inhibition criteria, as shown in FIG. 4(b). In such a case, unnecessary write inhibition is performed on the track between the nth servo position and the (n+1) servo position. It is believed that the reason for this is that while the output DAC of the servo control represents a position in a neutral state, the servo is always on and the output DAC of the servo control never goes to the neutral state. Conventionally, it is also known that the predicted PES is calculated with a state estimator. However, the state estimator requires a high-performance processor such as a DSP. If it is used in a storage unit such as a disk drive unit, the cost is too high. For this reason, this state estimator is not realistic in products having low cost as their object.

An object of the present invention is to provide a method for preventing off-track writing which reduces the false triggers ("overkill") state caused by inaccurate prediction of the position of the head.

Another object of the present invention is to provide an improved method for preventing off-track writing without requiring a high-performance processor such as a DSP.

SUMMARY OF THE INVENTION

A disk drive with the capability to prevent off-track writing with reduced false triggering is described. An improved method of predicting the position of a head is used to determine whether the head is on or off-track. A position error signal at an nth servo position $P_n$ and a velocity $V_n$ at the nth servo position ($V_n = P_n - P_{n-1}$) are calculated using values read at the nth and n-1 head positions. Based on the calculated $P_n$ and $V_n$ and on the output of the servo controller at the nth servo position $U_n$, the predicted $PES_{n+1}$ is calculated as:

$$\text{Predicted } PES_{n+1} = P_n + V_n + kU_n$$

where k is a constant.

Data is inhibited from being written between the nth servo position and the (n+1) servo position, when absolute values of the calculated $P_n$, $V_n$, and predicted $PES_{n+1}$ meet any condition of the following conditions (1) through (3): (1) $|P_n| > C1$, (2) $|V_n| > C2$, and (3) $|\text{Predicted } PES_{n+1}| > C3$ where C1, C2, and C3 are constants determined for the embodiment.

DETAILED DESCRIPTION OF THE INVENTION

The off-track write prevention method of the present invention and the storage unit utilizing the method are characterized in that the following predicted $PES_{n+1}$ is calculated and used.

$$\text{Predicted } PES_{n+1} = P_n + V_n + kU_n$$

where $P_n$ is a position error signal at the nth servo position, $V_n$ is a velocity at the nth servo position ($V_n = P_n - P_{n-1}$), $U_n$ is the output of the servo controller at the nth servo position, and k is a constant.

That is, $P_n$ and $V_n$ are calculated from a value obtained by reading the nth servo position. Based on the calculated $P_n$ and $V_n$ and on $U_n$ obtained from output of a servo controller, the above-mentioned predicted $PES_{n+1}$ is calculated. Data is inhibited from being written to a track between the nth servo position and the (n+1) servo position, when absolute values of the calculated $P_n$, $V_n$, and predicted $PES_{n+1}$ meet any one of the following conditions (1) through (3):

$$|P_n|>C1 \quad (1)$$

$$|V_n|>C2 \quad (2)$$

$$|\text{Predicted } PES_{n+1}|>C3 \quad (3)$$

where C1, C2, and C3 are constants determined according to the specific embodiment. Note that $kU_n$ corresponds to the servo acceleration.

In a preferred form of the present invention, the output $U_n$ of the servo controller is calculated by the following equation:

$$U_n = DAC_n - \text{CENTER\_OFF} - ki/(1+k3+k4)*SPES_n$$

in which
$DAC_n$=output of the servo controller added with a bias value,
CENTER_OFF=bias value at a reference position,
k3, k4, ki=servo coefficients,
$SPES_n$=accumulated value of PES at the nth servo position.

In the present invention, the output (electric current) $U_n$ of the servo controller is considered in order to obtain the predicted $PES_{n+1}$. With this, an error between the values of the predicted $PES_{n+1}$ and actual $PES_{n+1}$ can be made small and the false triggering or overkill state can be reduced. In addition, the calculations of the predicted $PES_{n+1}$ in the present invention can be realized by adding only a small burden to the servo controller of the existing HDC.

Furthermore, the position predicting method of the invention initially calculates position information at a first position. Then, velocity information at the first position is calculated. Next, acceleration information at the first position is calculated from the position information and the velocity information. Finally, a second position is calculated from the position, the velocity, and the acceleration.

Figure 1:
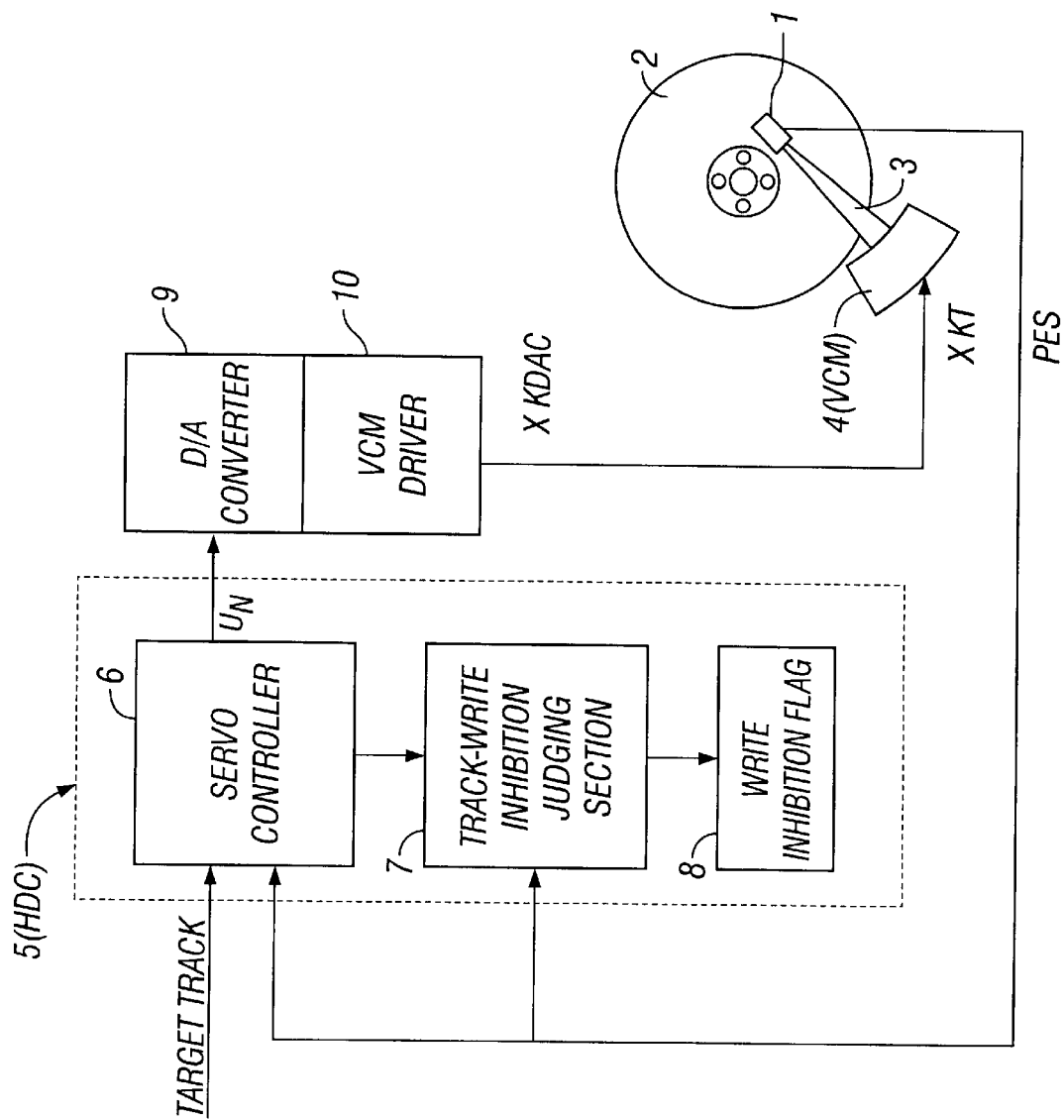
FIG. 1 is a diagram illustrating the constitution of a disk drive unit that carries out a method according to the present invention preventing an off-track write operation.

FIG. 1 is a diagram showing the constitution of an example of a drive unit that carries out a method of the present invention. In the example shown in FIG. 1, reference numeral 1 denotes a magnetic head, 2 a magnetic disk, 3 an actuator, 4 a voice coil motor (VCM), 5 a hard-disk controller (HDC), 6 a servo controller, 7 a track-write inhibition judging section, 8 a write inhibition flag, 9 a D/A converter, and 10 a VCM driver. In the example shown in FIG. 1, a prior art servo pattern recorded at predetermined positions on the magnetic disk 2 induces a pattern of signals in the magnetic head 2 which are used to obtain a position error signal (PES) using known methods. Information about the obtained PES and a target track is supplied to the servo controller 6. The servo controller 6 calculates an output $U_n$ for controlling the VCM 4, based on the supplied information about the PES and target track, and outputs the calculated Un. The output $U_n$ is supplied to the VCM 4 through the D/A converter 9 and the VCM driver 10. And the VCM 4 is controlled based on the supplied $U_n$.

The present invention is characterized in that in the track-write inhibition decision or "judging" section 7, the following judgment is made. First, $P_n$ and $V_n$ are calculated from a value obtained by reading the nth servo position. Based on the calculated $P_n$ and $V_n$ and on $U_n$ obtained from the servo controller output, the following predicted $PES_{n+1}$ is calculated.

$$\text{Predicted } PES_{n+1} = P_n + V_n + kU_n$$

where $P_n$ is a position error signal at the nth servo position, $V_n$ is a velocity at the nth servo position ($V_n = P_n - P_{n-1}$), $U_n$ is the output of the servo controller at the nth servo position, and k is a constant.

Track-write inhibition is judged (decided) when the absolute values of the calculated $P_n$, $V_n$, and predicted $PES_{n+1}$ meet any condition of the following conditions (1) through (3):

$$|P_n|>C1 \quad (1)$$

$$|V_n|>C2 \quad (2)$$

$$|\text{Predicted } PES_{n+1}|>C3 \quad (3)$$

where C1, C2, and C3 are constants. When the track-write inhibition judging section 7 judges track-write inhibition, the write inhibition flag 8 of the HDC 5 is turned on to inhibit writing of data to a track between the nth servo position and the (n+1)st servo position.

Figure 2:
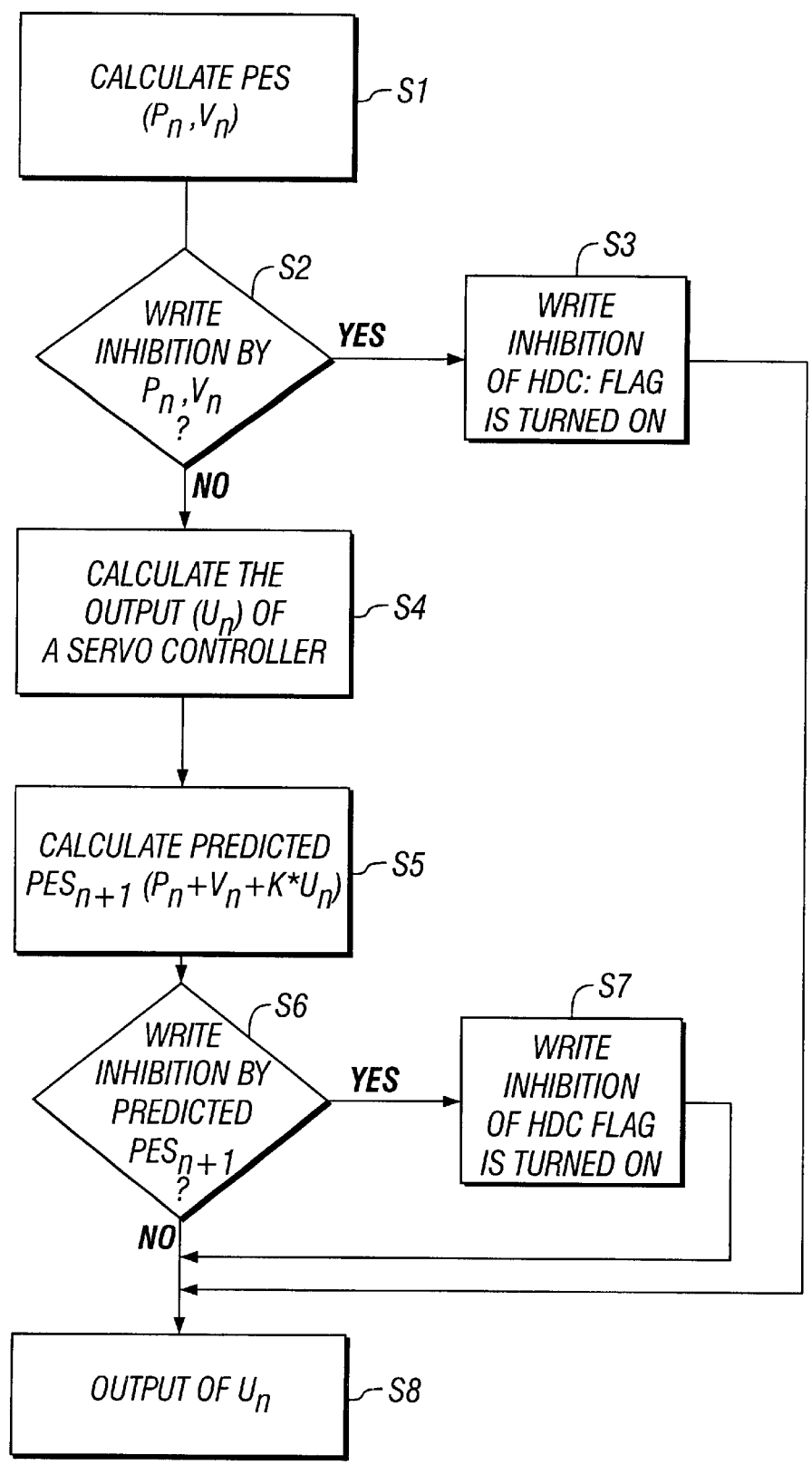
FIG. 2 is a flowchart illustrating an example of the off-track write prevention method according to the present invention.

FIG. 2 is a flowchart for explaining an example of how the off-track write prevention method of the present invention is actually carried out. In this example, as with the above-mentioned example, the predicted $PES_{n+1}$ is calculated by reading the nth servo position. The description below will be made with reference to FIG. 2. First, a PES is calculated to obtain $P_n$ and $V_n$ (S1). Then, a judgment of whether write inhibition or allowance is made with the obtained $P_n$ and $V_n$ (S2). When the judgment is write inhibition, the write inhibition flag 8 of the HDC 5 is turned on (S3). When the judgment is to allow writing, the output $U_n$ of the servo controller 6 is calculated (S4). Then, based on the obtained $P_n$ and $V_n$ and calculated $U_n$, predicted $PES_{n+1}$ ($|P_n+V_n+kU_n|$) is calculated (S5). Next, a judgment of whether write inhibition or write allowance is made with the calculated predicted $PES_{n+1}$ (S6). When the judgment is write inhibition, the write inhibition flag 8 of the HDC 5 is turned on (S7). When the judgment is write inhibition in step S3 the write inhibition flag 8 is turned on, and when in step S7 the write inhibition flag 8 is also turned on, $U_n$ is output to the D/A converter 9 (S8).

Figure 3A:
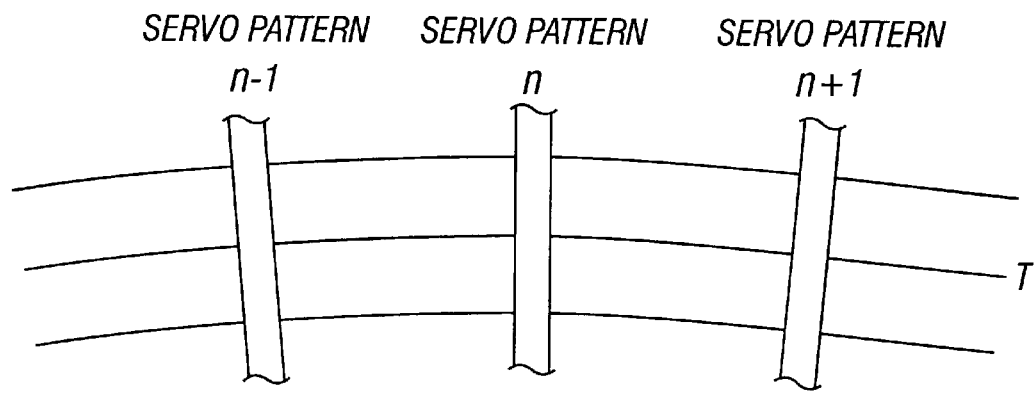
FIG. 3 is a diagram for explaining a predicted $PES_{n+1}$ obtained by the off-track write prevention method of the present invention.
Figure 3B:
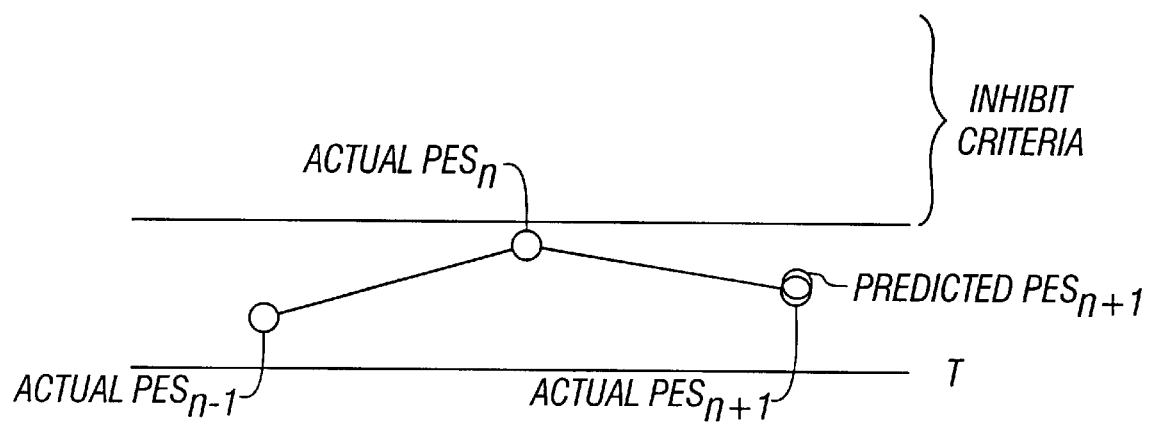
Figure 4A:
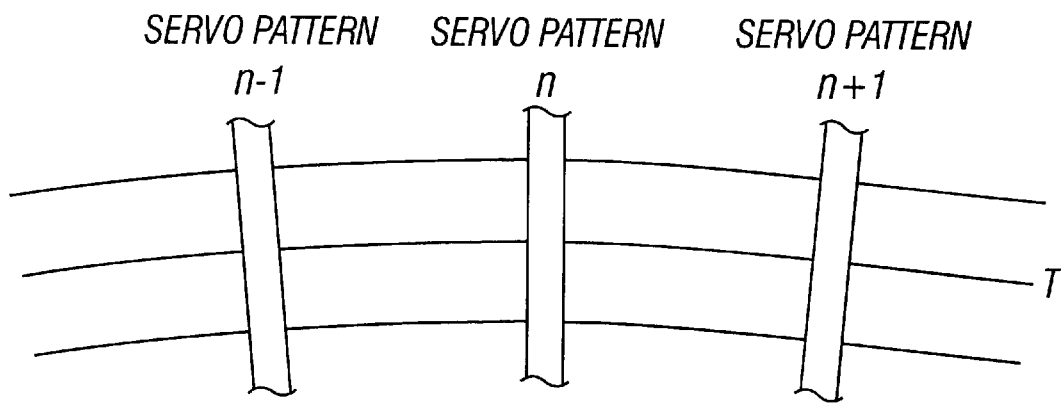
FIG. 4 is a diagram illustrating an example of a predicted $PES_{n+1}$ obtained by a prior art off-track write prevention method.
Figure 4B:
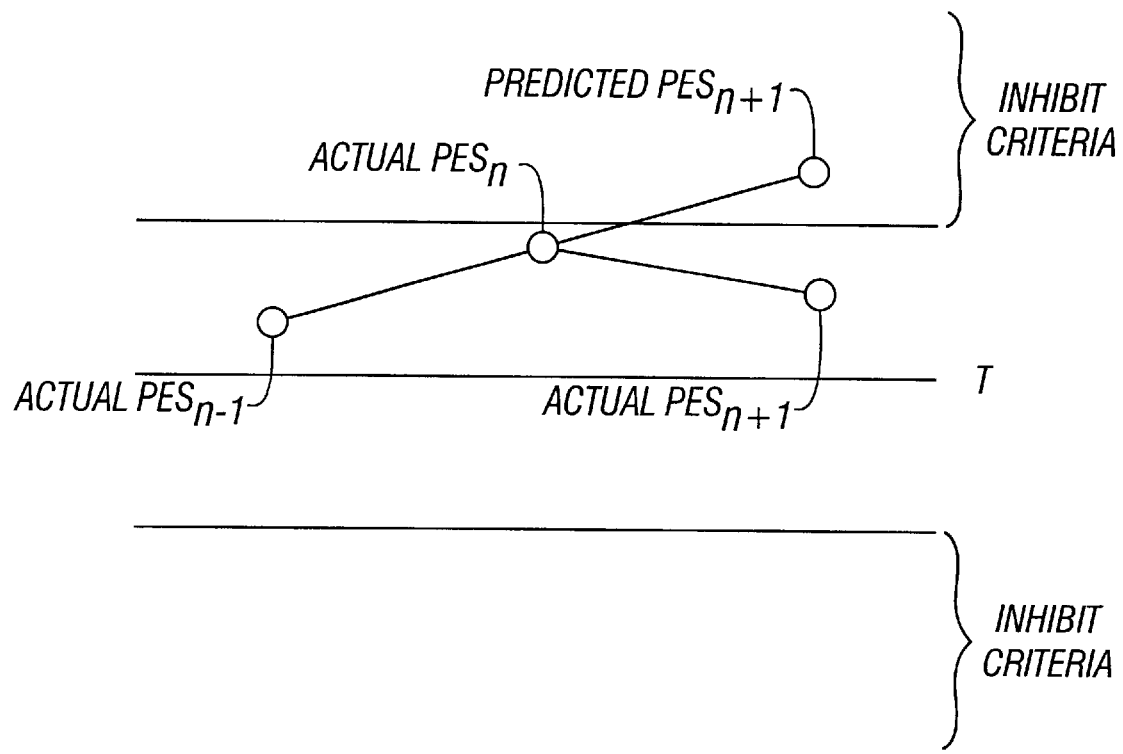

In the above-mentioned present invention, in FIG. 3 that corresponds to the conventional example shown in FIG. 4, the predicted $PES_{n+1}$ of the present invention in the state shown in FIG. 3(a) nearly matches with the actual $PES_{n+1}$, as shown in FIG. 3(b). In the prior art example shown in FIG. 4, the predicted $PES_{n+1}$ is within the range of the inhibit criteria, but in the present invention the predicted $PES_{n+1}$ is outside the range of the inhibit criteria, i.e., it is on track. Thus, in this case the data will not be inhibited from being written between the nth servo position and the (n+1)st servo position.

Note that the direct output $DAC_n$ of the servo controller 6 has been added with a bias value at that position. For this reason, it is preferable that $DAC_n$ minus a bias value be used as the output $U_n$ of the servo controller 6:

$$U_n = DAC_n - CENTER\_OFF - Ki/(1+k3+k4)*SPES_n$$

in which $DAC_n$=output of the servo controller added with the bias value,

CENTER_OFF=bias value at a reference position, k3, k4, ki=servo coefficient, $SPES_n$=cumulated value of PES at the nth servo position.

In the above-mentioned example, the coefficient k, constants C1, C2, and C3, and servo coefficients k3, k4, and ki differ depending the characteristics constant of the particular disk drive unit. Thus, optimal values are selected according to the constitution of the disk drive unit in which the invention is implemented. As the example, the following value is employed as the coefficient k for the predicted $PES_{n+1}$ of the present invention:

$$k = 0.5*Kdac*(Kt/J)*TS^2$$

in which

Kdac=current value per bit,

Kt=torque multiplier of the VCM,

Ts=sampling time,

J=inertia of the VCM.

The above-mentioned k is the approximate value of the distance traveled by the magnetic head per DAC (D/A converter) bit increment.

In a certain hard-disk drive unit, error averages with respect to a position after the seek operation were calculated based on the predicted $PES_{n+1}$ in which the value of k was varied. The results are shown in Table 1. In Table 1, the case of K=0 represents the case of conventional predicted $PES_{n+1}$ consisting of $P_n+V_n$. From the results of Table 1 it follows that in the case where the seek operation is performed based on the predicted $PES_{n+1}$ of the present invention with k=0.5–2.5, the error average is small and the overkill state is reduced, compared with the case where the seek operation is performed based on the conventional predicted $PES_{n+1}$ with k=0. From the results of Table 1 it also follows that it is preferable that k be set to a range of 0.5–2.5. Furthermore, it is understood that, in the case of k=1.5, the next position can be best predicted and this case is further preferred for this example.

TABLE 1

| k | Error average |
|---|---|
| 0 | 9.34 (= P + V) |
| 0.5 | 7.96 |
| 1.0 | 7.02 |
| 1.5 | 6.76 |
| 2.0 | 7.07 |
| 2.5 | 8.19 |

Also, in the case where the off-track write prevention method of the present invention is employed in a hard-disk drive unit, the method/means for carrying out the off-track write prevention can be implemented only by uniting it with the servo controller of the HDC, preferably as hardware, i.e., by assembling it in the Large Scale Integrated Circuit (LSI) of the HDC. For this reason, this method is inferior in accuracy to strict PES estimation employing a state estimator, but it can obtain sufficient accuracy for practical application. On the other hand, the present invention does not require a high-performance processor (DSP, etc.) as in the state estimator case. In this respect, in hard-disk drive units the off-track write prevention method can be executed at low cost and with ease.

According to the present invention, as is clear from the aforementioned description, the output (electric current) $U_n$ of the servo controller is considered in order to obtain the predicted $PES_{n+1}$. Thus, an error between the values of the predicted $PES_{n+1}$ and actual $PES_{n+1}$ can be made small and the overkill state can be reduced. In addition, the calculations of the predicted $PES_{n+1}$ in the present invention can be realized by adding a only a small functional load to the servo controller of the existing HDC.

What is claimed is:

1. A method of operating a disk drive to prevent off-track writing, comprising the steps of:

calculating a position error signal $P_n$ at an nth servo position;

calculating a head velocity $V_n$ at the nth servo position as ($V_n=P_n-P_{n-1}$) where $P_{n-1}$ is from a position error signal at an (n−1) servo position;

based on the calculated $P_n$ and $V_n$ and on $U_n$, calculating a predicted $PES_{n+1}$ as:

predicted $PES_{n+1} = P_n + V_n + kU_n$ where $U_n$ is the output of a servo controller at the nth servo position, and k is a constant; and inhibiting data from being written between the nth servo position and the (n+1) servo position, when absolute values of the calculated $P_n$, $V_n$, and predicted $PES_{n+1}$ meet any of the following conditions:

$|P_n|>C1$          (1)

$|V_n|>C2$          (2)

$|Predicted\ PES_{n+1}|>C3$          (3)

where C1, C2, and C3 are constants.

2. The method of claim 1, wherein the output $U_n$ of the servo controller is calculated by the following equation:

$$U_n = DAC_n - CENTER\_OFF - Ki/(1+k3+k4)*SPES_n$$

in which $DAC_n$ is a direct output of the servo controller,

CENTER_OFF is a bias value at a reference position, k3, k4, ki are servo coefficients, $SPES_n$=accumulated value of PES at the nth servo position.

3. A disk drive comprising:

a disk with servo information recorded at a plurality of servo positions around the disk;

a motor which rotates the disk;

a head;

an actuator which positions a head mounted thereon over the disk;

a servo system which uses signals from the head induced by the servo information to generate an output signal $U_n$ corresponding to servo position n to control the position of the head with the actuator using position error signal $P_n$ which corresponds to servo position n and stores position error signal $P_{n-1}$ which corresponds to servo position n−1 where servo positions n and n−1 are consecutive servo positions on the disk over which the head passes;

means for calculating a head velocity $V_n$ at servo position n as $(P_n-P_{n-1})$;

means for calculating a predicted PES as $P_n+V_n+kU_n$, where k is a predetermined constant; and means for inhibiting data from being written while the head is between the nth servo position and next servo position (n+1), when an absolute value of $V_n$ exceeds a first threshold value or when an absolute value the predicted PES exceeds a second threshold value.

4. The disk drive of claim 3, wherein the output signal $U_n$ of the servo controller is calculated by the following equation:

$$U_n = DAC_n - \text{CENTER\_OFF} - ki/(1+k3+k4)*SPECS_n$$

in which $DAC_n$ is a direct output of the servo controller,

CENTER_OFF is a bias value at a reference position, k3, k4, ki are servo coefficients, $SPES_n$ = cummulated value of PES at the nth servo position.

* * * * *